United States Patent [19]

French-St. George et al.

[11] Patent Number: 6,122,348
[45] Date of Patent: Sep. 19, 2000

[54] SYSTEM AND METHOD FOR MANAGING INCOMING COMMUNICATION EVENTS USING MULTIPLE MEDIA OPTIONS

[75] Inventors: Marilyn French-St. George, Alcoue; Mitch A. Brisebois, Wakefield; Laura A. Mahan, Kanata, all of Canada

[73] Assignee: Nortel Networks Corporation, Canada

[21] Appl. No.: 08/996,034

[22] Filed: Dec. 22, 1997

[51] Int. Cl.[7] .......................... H04M 1/64; H04M 11/06
[52] U.S. Cl. ................................ 379/88.23; 379/88.17; 379/88.14; 379/100.04
[58] Field of Search .................. 379/88.12, 88.13, 379/88.14, 88.22, 88.23, 88.25, 100.01, 100.08, 210, 211, 212, 207, 201; 455/412, 413

[56] References Cited

U.S. PATENT DOCUMENTS

| | | |
|---|---|---|
| 5,608,786 | 3/1997 | Gordon .............................. 379/100.01 |
| 5,633,916 | 5/1997 | Goldhagen et al. ................. 379/88.13 |
| 5,737,395 | 4/1998 | Irriabarren ............................ 379/88.13 |
| 5,742,905 | 4/1998 | Pepe et al. ............................... 455/461 |
| 5,751,791 | 5/1998 | Chen et al. ........................... 379/88.13 |
| 5,822,404 | 10/1998 | Cave .................................... 379/88.13 |
| 5,825,854 | 10/1998 | Larson et al. ....................... 379/88.13 |
| 5,832,221 | 11/1998 | Jones ................................... 379/88.13 |

*Primary Examiner*—Paul Loomis
*Attorney, Agent, or Firm*—Finnegan, Henderson, Farabow, Garrett & Dunner, L.L.P.

[57] ABSTRACT

A system and method for providing multisensory signaling capabilities enables a user to manage the receipt of incoming communication events, after an initial notification sequence, using multiple media options. Specifically, a remote device notifies a user of incoming communication events and offers real-time coupling of the notifications with communication management options. The message is delivered or otherwise processed according to the option selected.

39 Claims, 3 Drawing Sheets

SYSTEM AND METHOD FOR MANAGING INCOMING COMMUNICATION EVENTS USING MULTIPLE MEDIA OPTIONS

CROSS-REFERENCE TO RELATED APPLICATION

This application is related to U.S. patent application Ser. No. 08/611,961, to Van Schyndel et al., entitled A PERSONAL HANDS FREE COMMUNICATIONS DEVICE, filed Mar. 7, 1996, which is a continuation-in-part of U.S. patent application Ser. No. 08/257,254, filed Jun. 8, 1994, and is incorporated herein by reference.

BACKGROUND OF THE INVENTION

The present invention relates generally to communication management and more particularly, to a multisensory signaling structure that enables a user to manage the receipt of incoming communication events, after an initial notification sequence, using multiple media options.

Recent advancements in communication technology have made push media channels a reality. These channels typically "push" information to a designated receiving device (e.g., pager) without requiring a user to specifically request the information. This, in conjunction with development of integrated text and voice at the desktop and in mobile devices, creates an environment where users are increasingly demanding service strategies that allow them to prioritize competing demands on their attention.

Not only do busy people need a way of recognizing the context—the who, what, when, and why—of an incoming notification, they also need choices on how to respond to the request in real-time. For example, by structuring an alerting or notification sequence to provide more context about the nature of an interruption (i.e., the who, what, when, and why) and then integrating communication management options that are media independent, users may intercept and direct an incoming communication to a device or person of their choosing.

On the service delivery side of the equation, service providers are looking for ways of increasing their presence to the end user. To facilitate this endeavor, there is a need for a notification/signaling framework that enables service providers to configure their commercial appearance to the customer and tailor communication management options to maximize service availability. For example, with such a framework, a sports broadcaster can notify its subscribers of a particular newsworthy event via a multimedia banner. If the event is on video, the user can then select to receive the broadcast at their desktop computer, or perhaps listen to the play-by-play via a personal audio device.

Currently, real-time communication management options are limited (e.g., live voice calls can only be ignored or answered). Calling Line Identification (CLID) provides some real-time information regarding the "who" of the incoming-communication but more strictly reflects the source device rather than the user of the device. Display of Second Call Waiting Identification (DSCWID) provides some real-time communication management by enabling users to put a second call on hold while they finish the first. However, the constraints of CLID limit this feature by identifying the connection subscriber rather than the user.

In the text domain, there is currently no possibility of intercepting an e-mail on its way to an in-box. Text messaging services direct data, such as e-mail, to a user's in-box and then notify the user of its arrival. If the user wants to view the e-mail or call the sender back, they must first enter the mailbox, select the communication, open it, read it, and then reply. Other disposition options (e.g., forward, copy, delete) can only be invoked after the user receives the communication. Currently, there are no products that allow a user to intercept a communication during the notification sequence and re-route it to another device or person, or request the sender to alter the communication media.

There are some third party service providers that integrate text-based and voice-based communications into a single "inbox" and then notify the subscriber of their presence. Often times the notification is to a pager or a cell phone. In the latter case, media translation devices can recode a text file into speech. Although these services provide unified notification of all messages, they do not currently respond to the real-time voice calls, and often restrict access to information pertaining to the incoming communication to the device subscriber.

Therefore, it is desirable to provide a multisensory signaling structure that is applicable to a variety of receiving devices to allow a user to manage incoming communication events.

It is also desirable to provide the user with a number of call management options that may be invoked in real-time.

It is further desirable to structure notifications of incoming communication events.

In addition, it is desirable to couple real-time notifications with communication management options.

It is further desirable to route an incoming communication event to a receiving device or person of the receiver's choice in real-time.

It is also desirable to employ personal, wearable communication devices for receiving incoming multimedia notifications and information in a preselected format.

Finally, it is desirable to allow a user to intercept a communication, during the notification sequence and re-route it to another device or person, or request the sender to alter the communication media.

Additional desires, features and advantages of the invention will be set forth in the following description, and will be apparent from description or may be learned by practicing the invention.

SUMMARY OF THE INVENTION

Systems and methods consistent with the present invention meet these desires by allowing a user to manage the receipt of incoming communication events, after an initial notification sequence, using multiple media options.

A system consistent with this invention for managing an incoming communication event comprises means for notifying a user of the incoming communication event;

means for providing a plurality of communication management options to the user;

means for receiving a selection of one of the communication management options; and means for taking an action regarding the incoming communication event consistent with the selected communication management option.

A method consistent with this invention for managing an incoming communication event comprises the steps of notifying a user of the incoming communication event; providing a plurality of communication management options to the user; receiving a selection of one of the communication management options; and taking an action regarding the incoming communication event consistent with the selected communication management option.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION OF THE INVENTION

Reference will now be made in detail to the construction and operation of preferred embodiments consistent with the present invention that are illustrated in the accompanying drawings. In those drawings, like elements and operations are designated with the same reference numbers.

Figure 1:
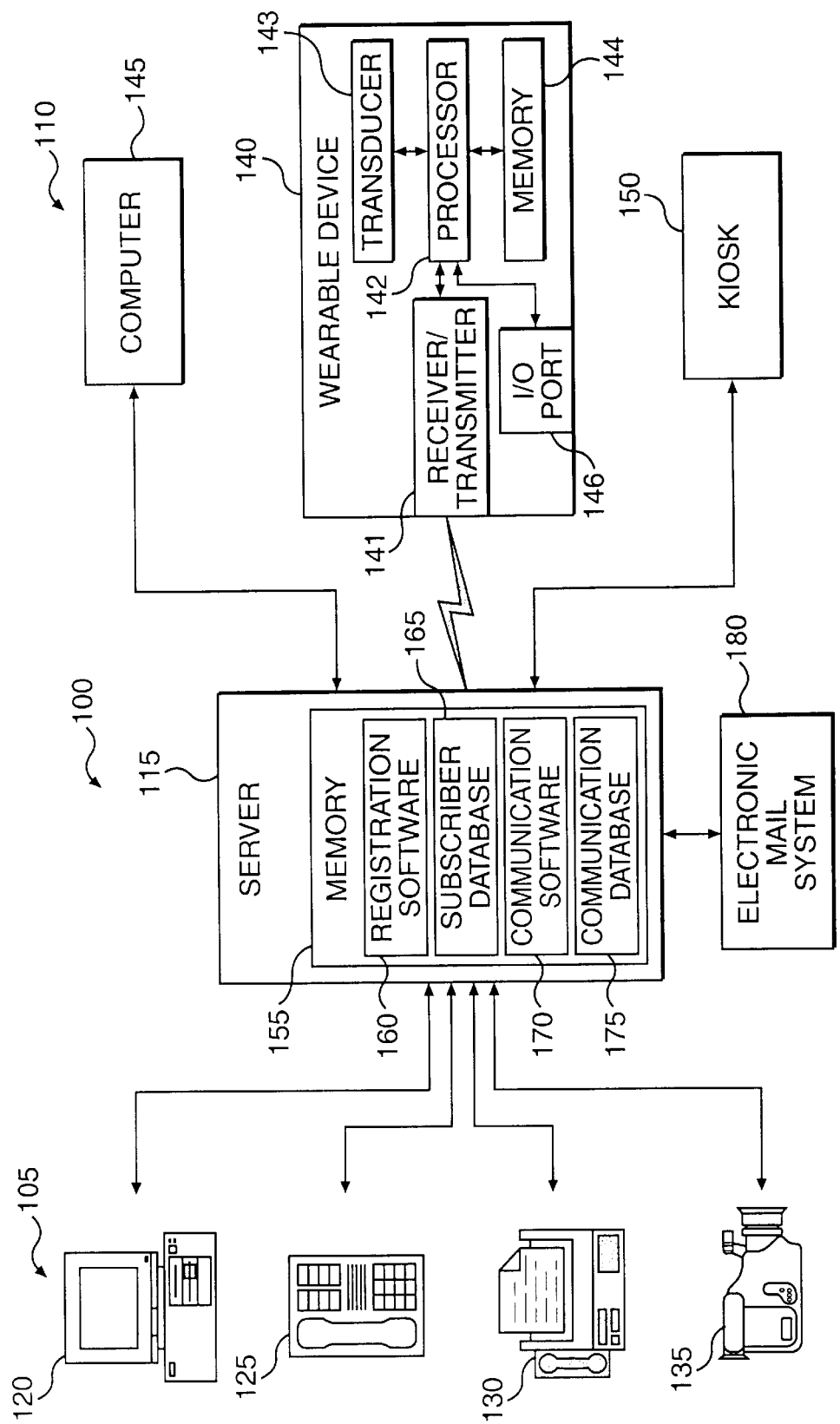
FIG. 1 illustrates a communications management system consistent with the present invention.

FIG. 1 illustrates a communications management system 100 including a plurality of source devices 105, terminal devices 110, and at least one server 115 that controls the transfer of information between source devices 105 and terminal devices 110. System 100, as illustrated in FIG. 1, provides a framework for implementing communications management functions consistent with the present invention. Other components such as a public switched telephone network (PSTN) or asynchronous transfer mode (ATM) network (not shown) are necessary to facilitate the transfer of information signals between multiple source and destination points. These networks consist of a series of network gateways that mediate communications between wireline, wireless, and computer networks.

Source devices 105 include a variety of media devices available to a user of system 100. These source devices may include a computer 120, telephone 125, fax machine 130, video device 135 or any other media source. The user or caller may use one or more of the above devices to transfer information to one or more parties over system 100.

Before attempting to contact a party, the user selects the information for transfer, defines whether the call is a new or return communication, chooses the type of communication link (i.e., voice or data), determines any additional receiver communication management options, and selects a source device 105. Preferably, system 100 automatically performs these functions based on the type of information being transferred and information previously provided by the user. In this instance, the user only needs to provide the information for transfer to system 100.

The type of information for transfer over system 100 can be in any form such as a document or audio message. The format of the information dictates the source device to be used to transfer the information. For example, if the user chooses to relay the information verbally or using a prerecorded voice message, then telephone 125 would be the preferred device. Nevertheless, the user may wish to send a document or e-mail a file to one or more parties, which would require a fax machine 130 or computer 120, respectively.

The user further has the option of defining whether the call is a new or return communication. This feature is important since the receiving party may be expecting an urgent return communication and thus, may choose not to respond to any new incoming communications. The user can communicate this information to server 115 when configuring a call. Alternatively, system 100 can determine whether the call is a new or return communication based on a prior communication between the two parties. In this instance, the prior call information is stored in a memory of server 115 as a profile specific to the user or communication event. A communication event is any type of voice or data transfer between two or more points. Thus, the communication event can be the transfer of video data or a voice message. The user can define the type of communication link used to transfer the selected information based on the available communication network. For example, if the user wishes to send a photograph, then the information would be transferred over a data communication link such as an ATM network. However, to transfer voice information in real-time, the PSTN is the more appropriate selection.

Based on the type of information transferred, the user can select communication management options for the receiving party. For example, if the user wishes to transfer a voice message to a receiving party concerning a relative's wedding but also has a video of the wedding, both a voice message option and a video option can be transferred to the receiving party. Any data (e.g., video, text) or voice format can be selected by the user as a communications management option for the receiving party. This selection is only limited by the format of the information for transfer. Preferably, system 100 is capable of automatically choosing certain communication management options based on the type of information being transferred and information previously provided by the user.

Finally, the user chooses a source device 105 for transferring the voice or data information (e.g., facsimile, audio, etc.). The communication device can be any device capable of transferring information. One feature of the invention is to signal the user (e.g., using a ringback function) when system 100 notifies the receiving party of the communication event. The signal may be sent back to the selected source device or a secondary device. For example, if the source device is a computer, the user can select to receive the ringback signal on a cellular telephone or pager by selecting this feature when configuring a communication event transfer with server 115. Preferably, system 100 can automatically choose the source device based on the type of information transferred and information previously provided by the user.

Terminal devices 110 may include a wearable device 140, computer 145, kiosk 150, or any other device capable of communicating voice/data signals to a receiving party. These devices include a transceiver for bidirectional communication, and receive and transmit voice and/or text data in real-time over a selected communication link.

Preferably, terminal device 110 is a personal wearable device 140, such as SoundBeam™ manufactured by Nortel, that incorporates "Personal Space Audio" where the audio signal is not broadcast to the entire surrounding environment.

Wearable device 140 includes a receiver/transmitter 141, processor 142, transducer 143, memory 144, and input/output (I/O) port 146. Receiver/transmitter 141 receives and transmits voice and data signals between wearable device 140 and a remote device such as server 115. Receiver/transmitter 141 allows wearable device 140 to receive personal multimedia notifications at any time and anywhere over a wireless communication link. Processor 142 can be any processor capable of controlling the operation of wearable device 140 by interfacing with components of the device. For example, processor 142 processes incoming signals received through receiver/transmitter 142. Processor 142 then routes the signal to transducer 143 to output the signal in an audio, tactile, or visual format (e.g., beeping sound, silent vibration, or text messaging), or memory 144 (e.g., random access memory) for storage. In addition, processor 142 can route the signal to I/O port 146 which is configured to interface with other terminal devices 110 such as computer 145 or kiosk 150 to output the signal. These terminal devices 110 also include the components of wearable device 140 to perform functions consistent with the present invention as described herein.

Server 115 is a processor-based system that is customized to control the information transfer operation of system 100. Preferably, server 115 has high speed processing capability in order to service a large number of users and includes a memory 155 that stores a variety of software and information. Specifically, memory 155 stores registration software 160, subscriber database 165, communication software 170, and communication database 175.

Server 115 executes registration software 160 to register system 100 devices. Registration software associates the registered devices with one or more subscribers. Server 115 stores information about the subscribers in subscriber database 165 and communicates with system 100 devices using communication software 170. Communication software 170 includes software capable of transferring voice and data signals over any type of communication link. Server 115 stores information (e.g., the communication event) for transfer between source devices 105 and terminal devices 110 in communication database 175.

Server 115 performs a number of automatic functions including user/device recognition, caller recognition, communication status, and communication management options. In addition, server 115 provides integrated electronic mail box functions for system 100 subscribers via electronic mail system 180. Electronic mail system 180 can be any electronic mail system capable of storing voice, text, or video mail.

Server 115 automatically supports user and device recognition. Preferably, all user devices are registered with the server using registration software 160. This registration process is benign such that when a registered user communicates with someone via a new terminal device 110, the device is automatically registered. This assumes that terminal device 110 has a characteristic signature that defines such things as the media channels, the communication protocols, and the bandwidth that it can support. If these signatures are not defined or if a device is not supported by system 100, then server 115 automatically switches to a default setting that enables a standard signaling procedure (e.g., text messaging for pagers).

Preferably, unregistered users can subscribe to server 115 using terminal device 110. In this instance, server 115 first registers the new subscriber using registration software 160 and then stores information about the subscriber in subscriber database 165. Subscriber information is stored in all formats specified by the user and may include name, address and one or more telephone numbers. These formats might include photos, videos, text, or audio introduction scripts that subscribers use via server 115 to configure appropriate header information appearing in the receiving party's alerting sequence. The header information, stored in subscriber database 165, allows the receiving party to hear or see the name of the calling party.

Server 115 also establishes a user-centric relational database. As communication relationships develop between parties using system 100, categories for each registered user may be formed (e.g., home support services, office, recreational, family) and stored in subscriber database 165. This high level categorization is encoded into the alerting sequence of system 100, thus allowing receivers to differentiate between "cold" incoming communications and those from individuals or organizations that have established a relationship with the receiver. As described above, system 100 facilitates the transfer of information from a user to a receiving party using various communication options and media formats. The following description provides the method for managing the communication events transferred over system 100.

Figure 2:
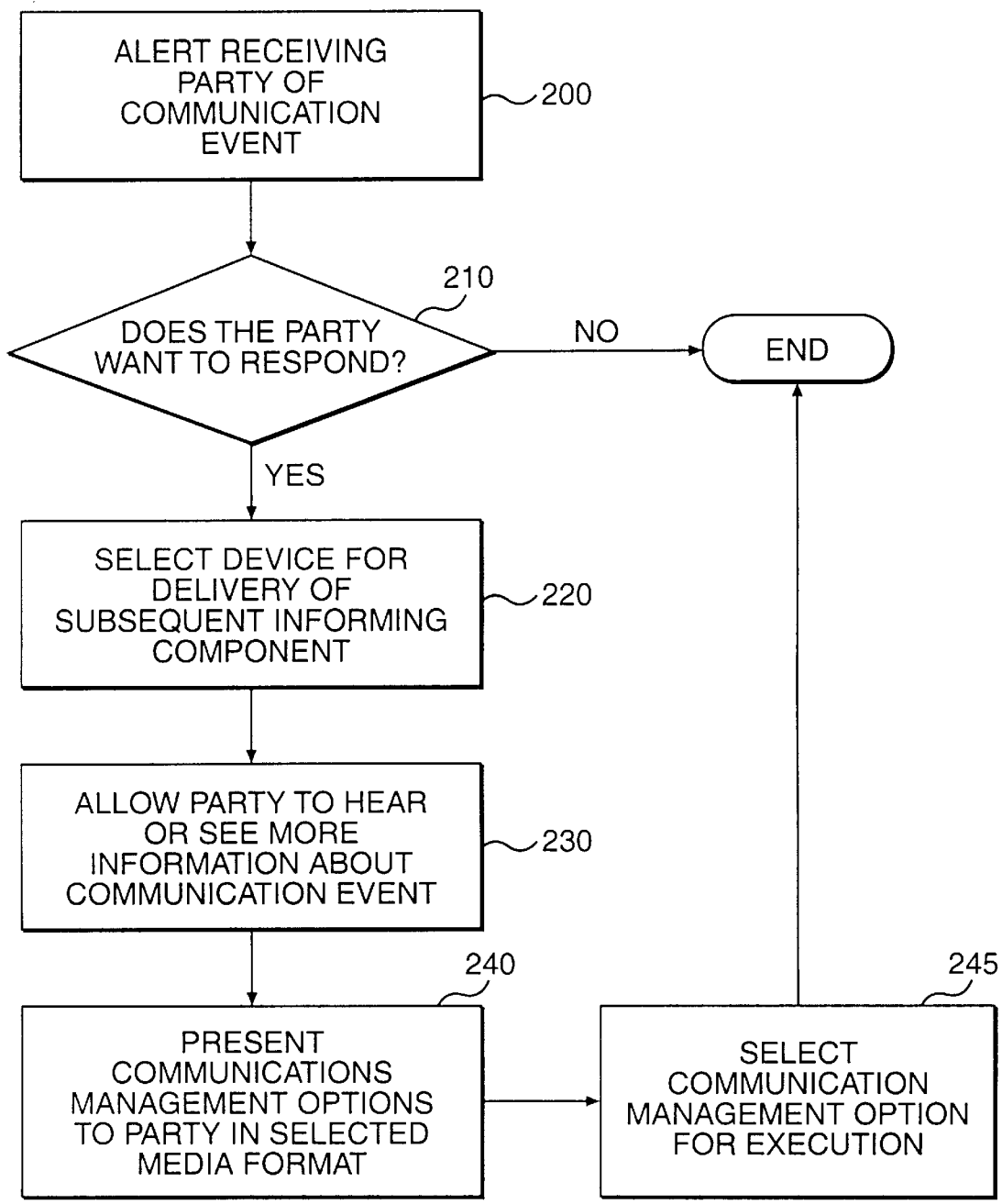
FIG. 2 shows a flowchart of a communications management method consistent with the present invention.

FIG. 2 is a flowchart illustrating a communication management method consistent with the present invention. Specifically, the flowchart of FIG. 2 illustrates a signaling sequence received at terminal device 110 of the receiving party. The signaling sequence includes an alerting component and informing component.

Before transferring information, system 100 alerts a selected receiving party of the incoming communication event (step 200). The alerting component is brief (typically the duration of a single ring sequence of a traditional phone) and multisensory, consisting of tactile, auditory, and visual components. System 100 bases the timing of the alerting component on current telephony ring signaling. However, in system 100, only the first "ring" sounds automatically with subsequent audio and visual output being mediated by the receiving party.

The receiving party may choose to respond to or ignore the alert signal based on the audio or visual information sent during the alerting component (step 210). Server 115 encodes categorical variables (e.g., urgency and synchronous communication requests) via the tactile channel, and categorical or continuous variables (e.g., relationship category or name of caller) via the audio and visual channels. For example, server 115 can encode the distinction between an incoming message (where the sender is not requesting synchronous interaction), and an incoming request for dialogue (e.g., a voice call, or video conference) in the tactile channel. In addition, server 115 can transmit the relationship category (e.g., business, home, recreational) in the audio channel, while the caller name and topic is shown on a small display during the alerting component of the signaling sequence.

At the termination of the alerting component, the party may select a device for delivery of an associated incoming communication event (step 220). The party selects a device using a designated input function. For example, wearable device 140 may include a voice recognition response system where the receiving party speaks a predetermined command into the device to make a selection. This selection may include any terminal device registered with server 115.

The selected device allows the party to see or hear more information about an incoming communication event (step 230). Based on its media format, the incoming communication event routes either to the audio channel or visual channel of terminal device 110. If the party directs the communication event to a large display device, such as a computer, the user will see detailed information about the nature of the incoming communication. In this instance, the selected terminal device dictates the configuration of audio and visual channels for incoming communication event output. For example, a user might be seated at their computer when an incoming alert is detected. The computer recognizes that the incoming communication is a return video message. The tactile channel presents a distinct cadence that the user recognizes as a message. The audio channel presents a signal that is recognized as a reply, while the name of the caller is displayed in a small wearable screen, together with a topic line (e.g., "video that you requested"). At this point, the user touches a predetermined button on the computer to select the computer or other terminal device on which to view further information regarding the incoming communication event.

If the selected device is not properly configured to receive the incoming communication event, system 100 informs the caller through the ringback sequence. For example, the caller would be notified during the ringback sequence if the receiving party selected a communication device that was not matched to the media configurations of the incoming request. If the selected device configuration is proper, server 115 transmits further information about the communication event to the selected computer, as used in this example. The receiving party then, for example, touches a predetermined button on the computer, preferably located on a mouse, to view the additional information on the computer display. The subsequent information may include a distribution list for the communication or return communication paths preferred by the caller for responding to the video message. If the receiving party had decided to listen to the video message, they could have responded to the initial alert by touching a button associated with a personal audio device (e.g., wearable device 140). At that point, server 115 informs the receiving party that a distribution list and return call paths are available.

In addition to the subsequent information, server 115 presents the receiving party with communication management options (step 240). These options are described below with respect to FIG. 3. Server 115 then prompts the receiving party to select a communication management option for execution (step 245). These communication management options allow the receiving party to control receipt (i.e., how and when) of the communication event. Upon executing the selected option, system 100 completes the communication functions available to the receiving party.

Figure 3:
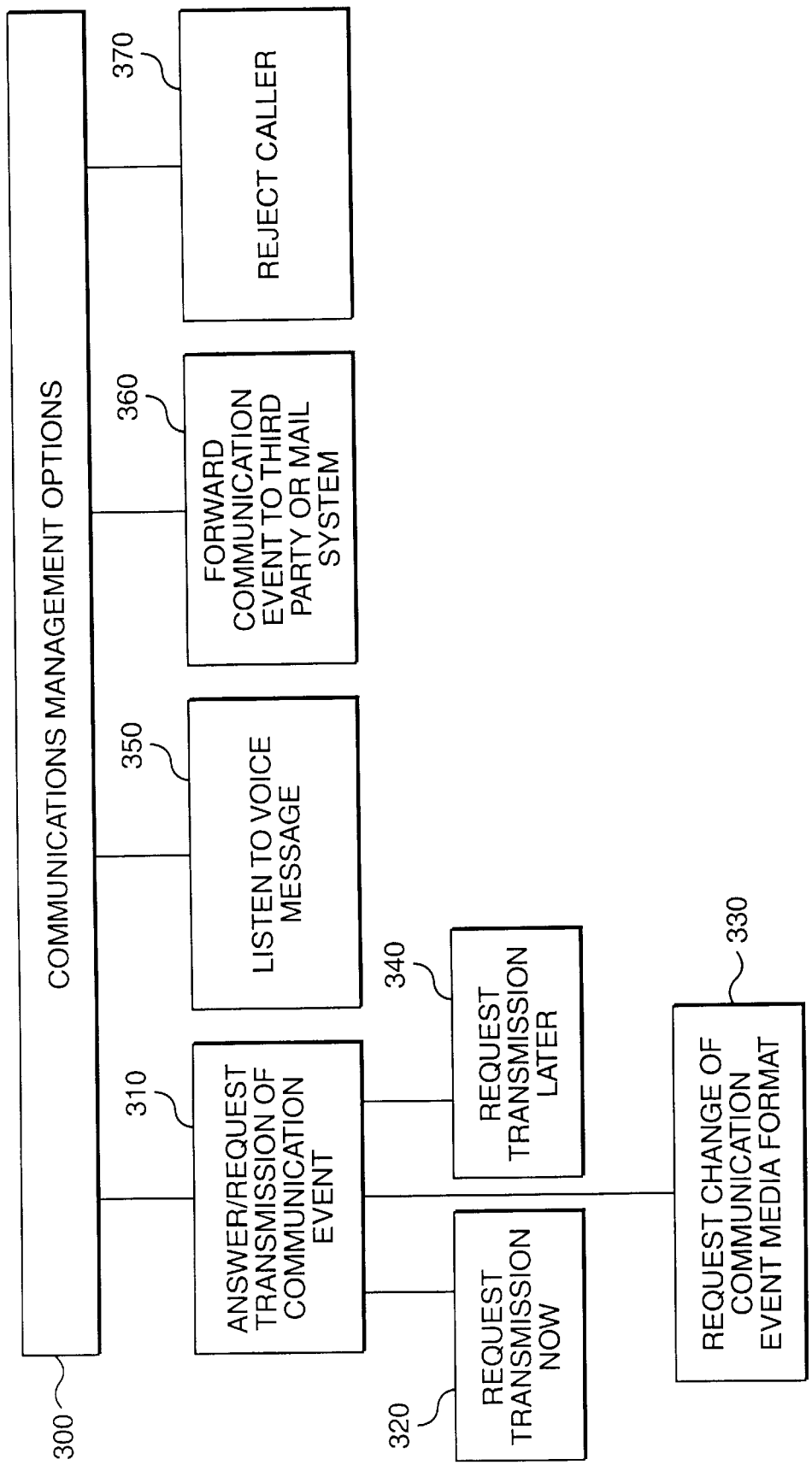
FIG. 3 shows a communications management options diagram available to a user of the communications management system of FIG. 1.

FIG. 3 is a diagram of communications management options 300 available to the receiving party in a menu format. These options include answering or requesting transmission of the communications event 310, retrieving and listening to a voice message 350, forwarding or "bouncing" the call to one or more parties 360, and rejecting the call 370.

Answering or requesting transmission of the communication event 310 includes the suboptions of requesting the transmission now 320, requesting a change of communications media format 330, and requesting transmission later 340. Requesting the transmission now 320 provides a real-time coupling of the communication event (e.g., video message) with the terminal device selected by the receiving party. Requesting a change of communications media format 330 allows the caller to select the communication event in an audio or visual format. The format used by the sender and the capabilities of the terminal device may preclude changes in media format. However, audio and visual components may be separated for the convenience of the receiving party. For example, a party may receive a personal multimedia alert during a meeting indicating that a colleague wants to talk immediately. Since it is inconvenient to leave the meeting, the party can take advantage of an answer option that allows for a request to change media. This request informs the sender that a text message should be sent since it is inconvenient to talk right now.

Requesting the transmission later 340 prompts server 115 to save the message in communication database 175 for later retrieval. Preferably, server 115 can mediate a later time to send the transmission. In this instance, server 115 initiates the later transmission at the mediated time. For example, when the receiving party selects this communication management option, server 115 can request a more appropriate time to send the communication event and initiate a subsequent transmission at that time. Alternatively, the receiving party may dial into the server using a password or other security function to access and retrieve the message at a later time.

Listen to voice message 350 allows a receiver to automatically request that the caller leave a message rather than complete the requested synchronous dialogue. Server 115 informs the caller through the ringback sequence if the receiver selects this option. Once the voice message is recorded, server 115 then alerts the receiver of the recorded voice message.

Forward communication event to third party 360 allows the receiver to re-route the communication to other people or devices. The other people may be part of a group registered with system 100, such as a "business partners" category. In this example, the receiving party requests server 115 to route the call to the predetermined "business partners" category so that everyone within that registered group receives the communication. The communication event may also be forwarded to other devices including mail system 180. The mail system preferably includes electronic mail, video mail or voice mail capabilities. System 100 presents one or more of these mail options to the receiving party in the communications management options menu. System 100 also allows the receiving party to request receipt of any replies to the forwarded message.

Reject caller 370 allows the receiver to deny further access from one or more callers. This feature is useful to prevent unwanted calls or messages from one or more callers. The receiving party may modify the account at a later time to permit subsequent communication with that caller.

System 100 offers versatile communication management techniques that provide a low-intrusive solution to modern personal communication needs. System 100 is not only a multisensory signaling structure that can be applied to a variety of receiving devices, but also a tool for coupling real-time notifications with communication management options. These communication management options allow a party to control how, when and where to receive incoming communications events. The party may receive these events in a variety of media formats adding further versatility to the system. Moreover, users of system 100 may receive incoming communication events on any device capable of receiving and transmitting voice or data signals. Thus, system 100 does not require "special" equipment to provide effective communication between two or more parties.

While there has been illustrated and described what are at present considered to be preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique, or implementation to the teachings of the present invention without departing from the scope of the invention. Therefore, this invention should not be limited to the particular embodiments and methods disclosed herein, but should include all embodiments falling within the scope of the appended claims.

What is claimed is:

1. A system for managing an incoming communication event having a predetermined media format, comprising:
   means for notifying a user of the incoming communication event;
   means for providing a plurality of communication management options to the user, including an option to change the media format of the communication event;
   means for receiving a selection of one of the communication management options; and
   means for taking an action regarding the incoming communication event consistent with the selected communication management option.

2. The system of claim 1 wherein the option to change the media format includes a choice of a terminal device on which to receive the communication event.

3. The system of claim 1 wherein the notifying means includes means for signaling a device accessible to the user over a wireline communications link.

4. The system of claim 1 wherein the notifying means includes means for signaling a device accessible to the user over a wireless communications link.

5. The system of claim 1 wherein the notifying means includes means for providing an audio signal to the user.

6. The system of claim 1 wherein the notifying means includes means for providing a visual signal to the user.

7. The system of claim 1 wherein the notifying means includes means for providing a tactile signal to the user.

8. The system of claim 1 wherein the taking an action means includes means for forwarding the incoming communication event to another destination.

9. The system of claim 1 wherein the taking an action means includes means for routing the incoming communication event to an electronic mail system.

10. The system of claim 1 wherein the taking an action means includes means for routing the incoming communication event to a video mail system.

11. The system of claim 1 wherein the taking an action means includes means for routing the incoming communication event to a voice mail system.

12. The system of claim 1 wherein the receiving a selection means includes a transceiver.

13. The system of claim 12 wherein the transceiver includes means for notifying the user of the incoming communication event in an audio format.

14. The system of claim 12 wherein the transceiver includes means for notifying the user of the incoming communication event in a tactile format.

15. The system of claim 12 wherein the transceiver includes means for notifying the user of the incoming communication event in a visual format.

16. The system of claim 1 wherein the taking an action means includes means for receiving the incoming communication event in real-time.

17. A transceiver for communicating with a server device over a communications link, comprising:
   means for receiving an information signal from the server device indicating the existence of a communication event in a predetermined media format;
   means for transmitting to the server device, in response to a user input upon receipt of the information signal, a command signal indicating the media format of the communication event should be changed; and
   means for delivering the communication event in the changed media format.

18. The transceiver of claim 17 wherein the delivering means delivers the communication event in an audio format and the predetermined media format is a video format.

19. The transceiver of claim 17 wherein the delivering means delivers the communication event in a text format and the predetermined media format is an audio format.

20. The transceiver of claim 17 wherein the delivering means delivers the communication event in a visual format and the predetermined media format is not a visual format.

21. A method for managing an incoming communication event having a predetermined media format, comprising the steps of:
   notifying a user of the incoming communication event;
   providing a plurality of communication management options to the user, including an option to change the media format of the communication event;
   receiving a selection of one of the communication management options; and
   taking an action regarding the incoming communication event consistent with the selected communication management option.

22. The method of claim 21 wherein the option to change the media format includes a choice of terminal device on which to receive the communication event.

23. The method of claim 21 wherein the notifying step includes the step of signaling a device accessible to the user over a wireline communications link.

24. The method of claim 21 wherein the notifying step includes the step of signaling a device accessible to the user over a wireless communications link.

25. The method of claim 21 wherein the notifying step includes the step of providing an audio signal to the user.

26. The method of claim 21 wherein the notifying step includes the step of providing a visual signal to the user.

27. The method of claim 21 wherein the notifying step includes the step of providing a tactile signal to the user.

28. The method of claim 21 wherein the taking an action step includes the step of forwarding the incoming communication event to another destination.

29. The method of claim 21 wherein the taking an action step includes the step of routing the incoming communication event to an electronic mail system.

30. The method of claim 21 wherein the taking an action step includes the step of routing the incoming communication event to a video mail system.

31. The method of claim 21 wherein the taking an action step includes the step of routing the incoming communication event to a voice mail system.

32. The method of claim 21 further comprising the step of delivering the incoming communication event in an audio format.

33. The method of claim 21 further comprising the step of delivering the incoming communication event in a tactile format.

34. The method of claim 21 further comprising the step of delivering the incoming communication event in a visual format.

35. The method of claim 21 wherein the taking an action step includes the step of receiving the incoming communication event in real-time.

36. A method for communicating information between a transceiver device and a server device over a communications link, comprising the steps of:

receiving an information signal from the server device indicating the existence of a communication event in a predetermined media format;

transmitting to the server device, in response to a user input upon receipt of the information signal, a command signal indicating the format of the communication event should be changed; and delivering the communication event to a user in the changed media format.

37. The method of claim 36 wherein the delivering step includes the step of delivering the communication event in an audio format and the predetermined media format was a video format.

38. The method of claim 36 wherein the delivering step includes the step of delivering the communication event in a text format and the predetermined media format was an audio format.

39. The method of claim 36 wherein the delivering step includes the step of delivering the communication event in a visual format and the predetermined media format was not an audio format.

* * * * *